United States Patent [19]

Ziegel

[11] Patent Number: 4,560,853
[45] Date of Patent: Dec. 24, 1985

[54] POSITIONING AND BONDING A DIAMOND TO A STYLUS SHANK

[75] Inventor: Douglas H. Ziegel, Indianapolis, Ind.

[73] Assignee: RCA Corporation, Princeton, N.J.

[21] Appl. No.: 570,231

[22] Filed: Jan. 12, 1984

[51] Int. Cl.[4] .............................................. B23K 26/02
[52] U.S. Cl. ....................... 219/121 LD; 76/DIG. 12; 219/121 LM; 228/122
[58] Field of Search .................. 219/121 LC, 121 LD, 219/121 L, 121 LM, 121 LE, 121 LF, 121 LY, 146.1; 125/39, 40; 76/101 R, DIG. 12; 228/122, 263.13, 56; 408/145; 420/503; 407/119

[56] References Cited

U.S. PATENT DOCUMENTS

| | | | |
|---|---|---|---|
| 2,961,750 | 11/1960 | Bender | 228/122 X |
| 3,424,890 | 1/1969 | Van Ruyven | 219/121 LD |
| 3,678,568 | 7/1972 | Knippenberg et al. | 228/122 |
| 3,868,750 | 3/1975 | Ellis et al. | 125/39 X |
| 4,117,302 | 9/1978 | Earle et al. | 219/121 LY X |
| 4,205,425 | 6/1980 | Shinozaki | 29/420 |
| 4,340,954 | 7/1982 | Chio et al. | 369/173 |

Primary Examiner—C. L. Albritton
Assistant Examiner—Alfred S. Keve
Attorney, Agent, or Firm—Birgit E. Morris; Donald S. Cohen; Joseph D. Lazar

[57] ABSTRACT

A method for positioning a diamond stone in an indented shank is described. A wetting agent put in contact with a diamond draws it upwardly into the indentation in the shank. A brazing material is added to the wetting agent to be drawn into the interface between the diamond and the shank indentation. After drying the wetting agent from the assembly, a laser beam heating the shank effects a strong, acid resistant braze of the shank and diamond A novel brazing material in weight percent of 71% silver, 28% copper, 0.75% nickel, with 0.25 to 0.35% in the aggregate of any one or more of ruthenium, rhodium or iridium provides a strong bond with significant acid resistance.

20 Claims, 6 Drawing Figures

POSITIONING AND BONDING A DIAMOND TO A STYLUS SHANK

This invention relates to a stylus fabricated from a diamond stone, particularly a synthetic diamond stone.

BACKGROUND OF THE INVENTION

Information playback systems frequently utilize a stylus for reading signals from the surface of an information record. A stylus formed of a synthetic diamond stone and a metal shank is described in U.S. Pat. No. 4,340,954 issued to Chio and Kim on July 20, 1982. In a typical assembly of a synthetic diamond (hereinafter, simply "diamond") to a shank, a manual operation involves picking and selecting the diamond and placing it in the shank using a microscope to view the components.

There is a need for handling, aligning and bonding the diamond to a metal shank in a more rapid and reliable method than presently done totally manually with visual observation.

SUMMARY OF THE INVENTION

The method of the present invention uses the surface tension of a wetting agent to draw a diamond stone from a flat surface to a downwardly facing indentation in a shank. Brazing material is added to the wetting agent to be thereby drawn into the interface of the diamond and indentation. After drying the wetting agent, a laser beam heating the shank effects a strong and acid resistant brazed bond of the diamond to the shank.

DETAILED DESCRIPTION OF THE PREFERRED EMBODIMENT OF THE INVENTION

Figure 5:
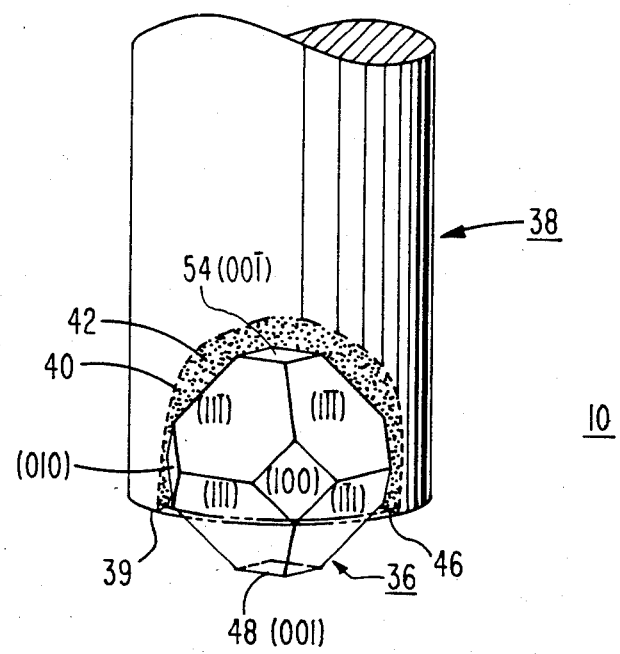
FIG. 5 is an enlarged view showing in detail the desired orientation of a particular stone in position in the shank.

This invention is concerned with the fabrication of a stylus of the type described in U.S. Pat. No. 4,340,954, mentioned above and incorporated herein by reference. As shown in FIG. 5 herein, the synthetic diamond stone 36 is positioned within an indentation 40 of a metallic (typically, titanium) shank 38 providing thereby the blank for a stylus 10. The stone 36 is preferably provided with a metallic film such as titanium. The stylus 10 is thereafter processed to provide an electrode and shaped with a keel as shown, for example, in FIG. 1 of the above-identified U.S. Pat. No. 4,340,954.

Figure 3:
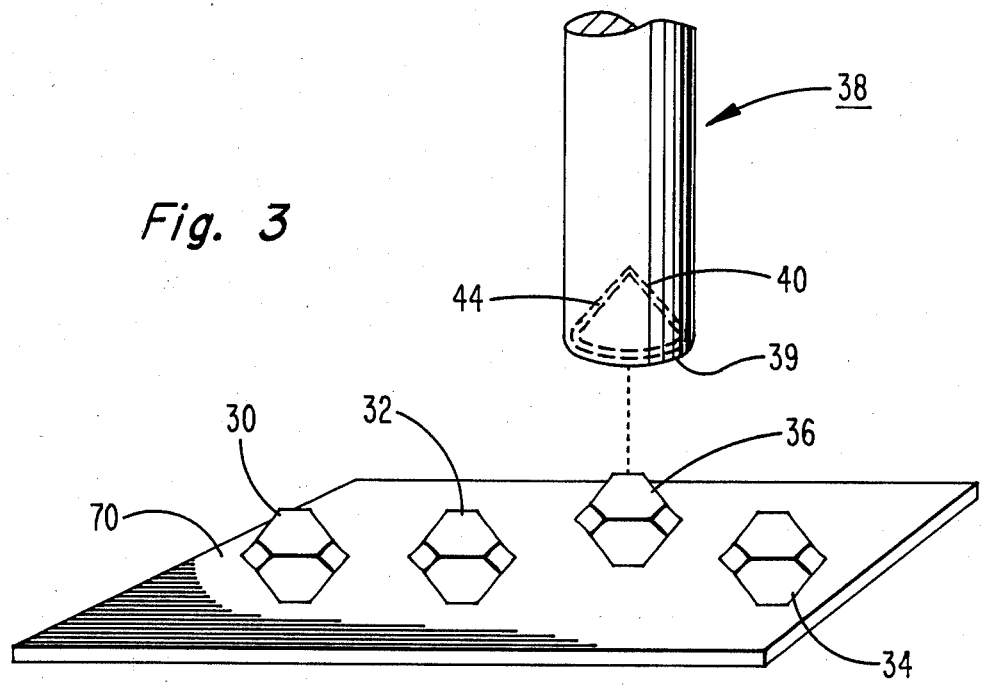
FIGS. 3 and 4 are schematics in perspective showing the steps in sequence of a wetted shank positioned to receive and capture the stone in the indentation.
Figure 4:
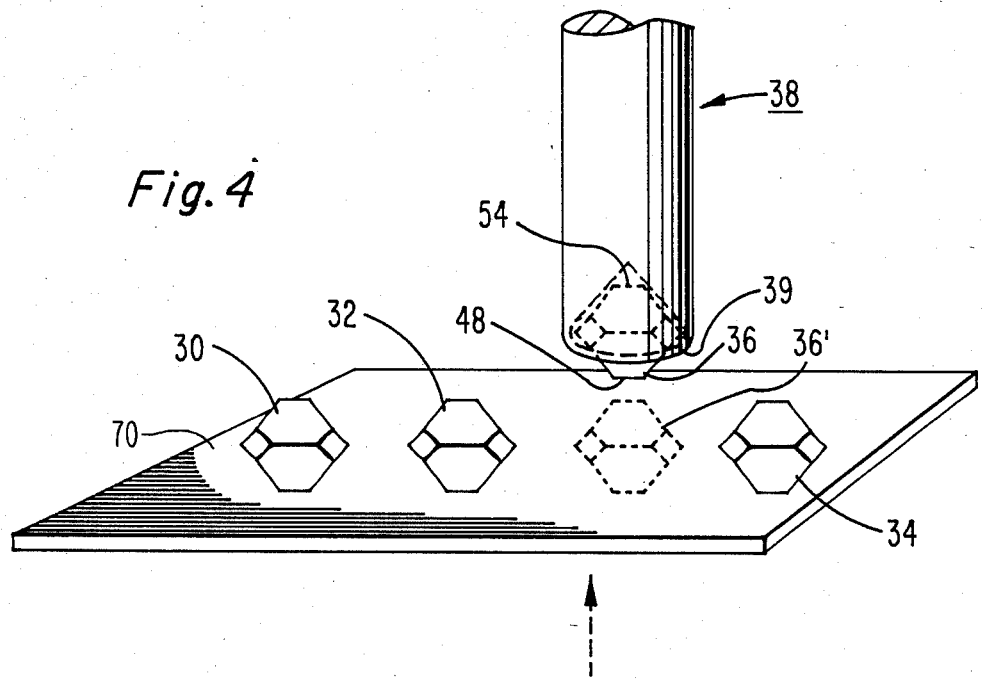

Conventional techniques require manual handling of each diamond stone 36 for positioning and aligning it on the shank 38. It is difficult to perform these operations rapidly even with the aid of a microscope. The present invention provides a technique for rapidly positioning a selected diamond in the indentation of a shank as illustrated by FIGS. 3 and 4 to be described.

Figure 1:
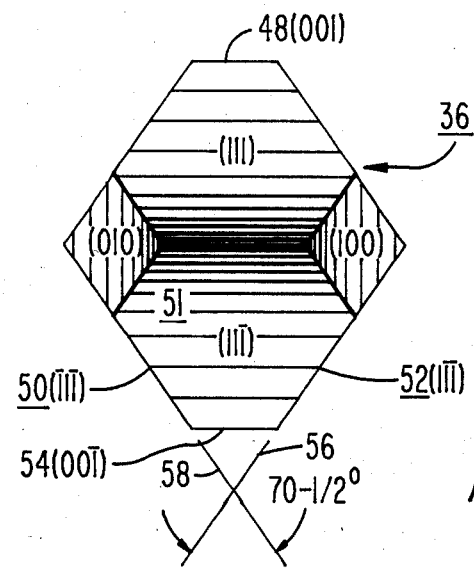
FIG. 1 is an elevation view of a synthetic diamond stone used in the invention.

The synthetic diamond stone 36 to be used in describing the present method is shown in FIG. 1. Stone 36 has a plurality of facets oriented along the (100) family of planes, and a plurality of facets oriented along the (111) family of planes. In the present example, the stone 36 comprises a cubo-octahedron stone having six (100) facets and eight (111) facets. Although the stone 36 in FIG. 1 is shown as an almost-perfect cubo-octahedron stone, in actual samples the facets, along a specific family of planes, are shaped slightly differently and have different surface area sizes. The stone 36 is to be mounted in a pyramidal-shaped indentation or cavity 40 at the end of the shank 38 shown in FIG. 5.

As explained in the above-identified U.S. Pat. No. 4,340,954, from studies made on appraising synthetic diamond stones, it has been found that the portion of the stone adjacent the centers of the larger (100) facets have the lowest inclusion density. The larger surface areas result in the growth of the synthetic diamond from the lowest linear growth rate of the faces. These larger surface areas have the lowest inclusion density. Accordingly, the facets having the largest surface area oriented along the (100) family of planes result from the higher linear growth rates of the adjacent facets oriented along the (111) family of planes. A typical stone 36 having the desirable properties just mentioned is shown in FIG. 1. The largest face 48, typically (001) is to be positioned in the shank 38 such that it faces outwardly from the end of the shank 38. Subsequent steps in the processing of the stylus will provide a keel for the stylus tip that will be fabricated primarily from the end face 48. Each of the planes or facets 50, 51 and 52 are hexagonal in form while the top plane 48 and the bottom plane 54 are square. Planes 50(111), 51(111) and 52(111) define three surfaces of a truncated pyramid, the fourth face being at the rear of FIG. 1, not seen. The opposing planes 50 and 52, for example, define a dihedral angle of preferably $70\frac{1}{2}°$ as indicated by the lines 56 and 58 extending from the planes of 50 and 52 respectively. This dihedral angle is typical in synthetic diamond stones and is used in a particular design of the stylus. Other dihedral angles may be used as desired.

The stones are sorted for freedom from inclusions of foreign debris (dirt) and cracks. The stone shape should be cubo-octohedron and not be a twin (two stones grown together). Moreover, the selected stones are preferably free of skew, i.e., the stones are reasonably symmetrical. In a typical batch of stones, about 40% meet the above criteria.

Each of the stones are preferably coated with a film of metallic titanium or zirconium. In the present embodiment, titanium was used. As known in the art, the metal provides the link needed in the braze to effect bonding of the stone to the metallic shank.

Figure 2:
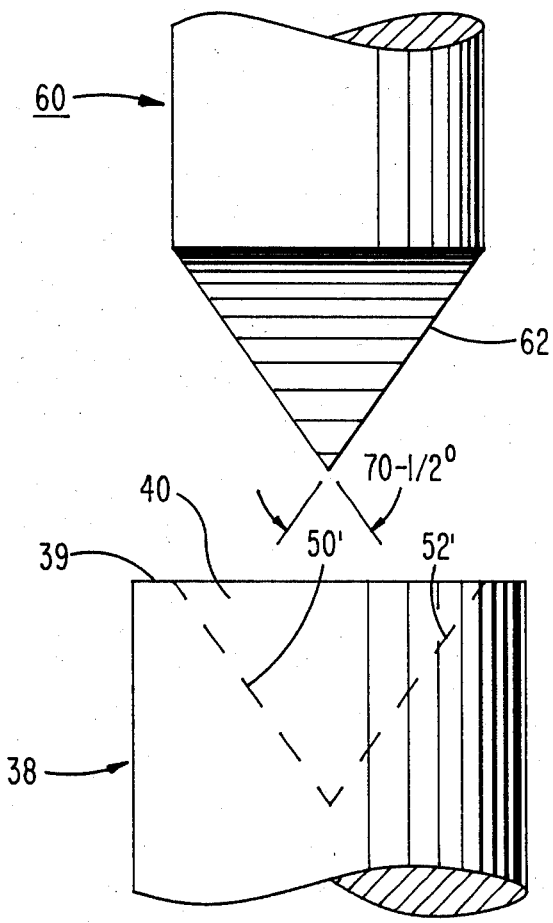
FIG. 2 is a schematic of a portion of a punch used to make an indentation in a shank for receiving the stone shown in FIG. 1.

A punch 60 formed typically of steel is provided with a pyramidal end 62 having a shape conforming to the pyramid that would have been defined by the stone planes 50, 51 and 52 (FIG. 1) if they had not been truncated by the square plane 54. Punch 62 is used to provide into the end of the shank 38 the indentation 40 having the shape essentially of the pyramid at the bottom portion of stone 36 of FIG. 1. The sidewalls 50' and 52' are shown to indicate the corresponding surface of the indentation 40 to the plane surfaces 50 and 52 of the stone 36. The other two surfaces of the pyramid are not seen in FIG. 2.

The stones 36 are initially sorted by a sorting apparatus to select the stones of the form as shown in FIG. 1 as explained above. A typical method and apparatus for accomplishing this is described in my U.S. Pat. No. 4,379,510 issued on Apr. 12, 1983, which patent is incorporated herein by reference. In brief, the stone sorting method of my patent provides for viewing each stone individually through a microscope after having been graded in rapid succession. The apparatus provides a means to pick up the diamond stones from a supply reservoir and move the stones into the field of view of the microscope. The operator makes a visual examination of the stone to determine whether it meets the requirements defined above. A simple operation in the sorting apparatus provides for either accepting or rejecting those stones. The stones so selected are then deposited on a flat surface. Thus, a plurality of diamonds 30, 32, 34, 36, etc. are deposited on the flat surface 70 shown in FIG. 3. If desired, the synthetic stone 30, etc. may be positioned in a row or in a recess of a surface suitably shaped to allow for easy access to them. However, within the principles of this invention, either the orientation or positioning of the stone on the surface is not critical.

The shank end 39 and indentation 40 are placed in contact with a liquid wetting agent 44 to wet at least the indentation 40 as indicated in FIG. 3. The indented shank end 40 is suitably wetted by touching the shank end 39 to a plate, rod, or roller (not shown) which has been dipped in or otherwise provided with the liquid wetting agent. The wetting agent 44 is a liquid that has low residue upon evaporation, has a slow evaporation rate (e.g., remains wet for about 15 minutes, a period of time adequate for the processing time needed) and has surface tension that causes the wetting agent liquid to adhere to the surface of the indentation 40 and wet and adhere to the surface of the stone 36. Moreover, the wetting agent must wet the brazing material which is subsequently added to braze the stylus, as will be explained.

I have found one excellent wetting agent that satisfies these requirements. I use, preferably, diethylene glycol monobutyl ether acetate, having a boiling point of 245° C. and, thus, a slow evaporation rate. Other wetting agents may be used as will be apparent to those skilled in this art. Experiments have shown that 2-octanol is a good wetting agent for this invention although it has a boiling point of 170° C. for a faster evaporation rate but, advantageously, leaving no residue. In addition, diethylene glycol dibutyl ether appears to be useful although it leaves a slight residue. Residue can cause discontinuities in the braze between the stone 30 and shank indentation 40 that could cause bond weakness.

The wetted shank 38 is then positioned in a generally vertical, downward direction over the surface 70 supporting the stones as shown in FIG. 3. A selected stone 36 is approached by moving the shank 38 thereover as the surface 70 is moved upwardly so that the stone 36 just contacts the end 39 of the shank 38 in the vicinity of the indentation 40. Upon contact, the wetting agent 44 draws the stone 36 into the indentation 40.

Typically, a stone (30, 32 . . . ) will be properly seated automatically in the indentation 40 by the drawing action effected by the surface tension of the wetting agent and the shape of the indentation conforming to all of the pyramidal portions of each stone. Each pair of pyramidal face angles are approximately the same, i.e., about 70½°. Moreover, since good quality synthetic stones have very low inclusions, any octahedral facet 48, 50, etc., can face outwardly from the shank 38 and serve as the stylus keel structure.

The shank 38 with the stone 36 is then moved by a suitable tool or manually into a viewing position of a microscope. The operator of the microscope determines whether any of the eight octahedral facets or six cube facets is positioned to face outwardly from the indentation 40. If the stone is not properly oriented, the operator maneuvers the stone 36 using a sharply-pointed probe by rolling it within the liquid wetting agent to seat it properly. It has been determined that the stone is automatically captured into the wetted indentation 40 with the large face 48 properly in about 15% of the attempts.

FIG. 4 illustrates the process step in which the stone 36 has been drawn into the indentation 40, the dotted lines 36' representing the position of the stone before it was drawn from the surface upwardly into the indentation 40.

I have discovered that the procedure of making contact between the wetted shank indentation 40 and the resting stone 36 is very sensitive and delicate. The wetting agent 44 can extend not only over the stone but also onto the surface 70. The surface tension of the agent 44 in contact with the surface 70 may thereby be so great as to prevent the stone 36 from being drawn up into the indentation 40. Accordingly, the step of contacting the stone must be done quite carefully. Moreover, the proper amount of the wetting agent applied to the tip of the shank 38 must also be done with care.

The action of the agent 44 drawing the stone 36 into the indentation 40 happens very rapidly based on several microscopic observations of the action. From these observations, it appeared that the stone 36 literally "jumped" from the surface into the indentation. This "jumping" phenomenon must have been the effect of the very rapid wetting action of the wetting agent 44 on the top surface of the stone 36, yet slow enough to not wet the dry surface 70.

The wetted shank 38 carrying the seated stone 36 held in position by the agent 44 is then treated with a mixture of brazing alloy powder and wetting agent by applying a drop of the mixture to the interface region between the stone 36 and the indentation 40. The wetting agent 44, as indicated above, also serves to wet the alloy 46 and carry it into the interface of the stone and the indentation in a moderately uniform manner.

The brazing mixture is comprised of a basic alloy in weight percent of 71.36 silver (Ag), 27.89 copper (Cu) and 0.75 nickel (Ni). This basic alloy is available in powder form under the trade name Nicusil No. 3 by Wesgo Co. of Belmont, Calif. To this basic conventional alloy, I add about 0.25 to 0.35 in the aggregate of any one or more of the powdered metals taken from the group consisting of ruthenium (Ru), rhodium (Rh) and iridium (Ir). These are mixed, preferably, although not necessarily, homogeneously and applied to the stone and shank interface region in any form.

Moreover, I have discovered that the addition of ruthenium resulted in an improved granular structure of the brazed bond. Bonds made without ruthenium revealed large grains which, it seems, contributed to weak bonds. Comparative strength tests of 300 samples show an average push-off force of the bonded diamond from the shank of 220 grams for braze materials with ruthenium and 170 grams for those without ruthenium.

The addition of these metals in the range indicated, provide a significantly good acid resistant braze. This corrosion resistant feature is important because acids are used to clean the stylus after the brazing step. If the braze is poor in its resistance to acid, the brazed stone can fail.

I prefer 0.25 weight percent of ruthenium in the brazing material. I have found that 0.35 weight percent is the largest amount that should be in the mixture. Larger amounts cause the final braze to be somewhat brittle. Amounts below 0.25 do not appear to be effective. In a preferred brazing material using 0.28 weight percent of ruthenium (Ru), the final constituency is: 71.16 Ag; 27.81 Cu; 0.748 Ni; and 0.28 Ru.

A still stronger brazed bond is made by making a paste of the mixed powders with the same wetting agent used to wet the indentation 40. In this embodiment, the acetate identified above, also at times known as butyl carbitol acetate, is used in sufficient amount to make a paste of the powder. The powder paste is applied with a needle to the interface region by contacting the wetting agent 44. The wetting agent 44 functions by its surface tension property to distribute the brazing mixture into the interface region.

The pasted shanks 38 are next dried to evaporate the wetting agent 44. This drying step can be done by allowing the stylus to remain overnight at room temperature. In the alternative, the pasted shanks 38 can be dried in an oven for 15 minutes at 180° F.

Figure 6:
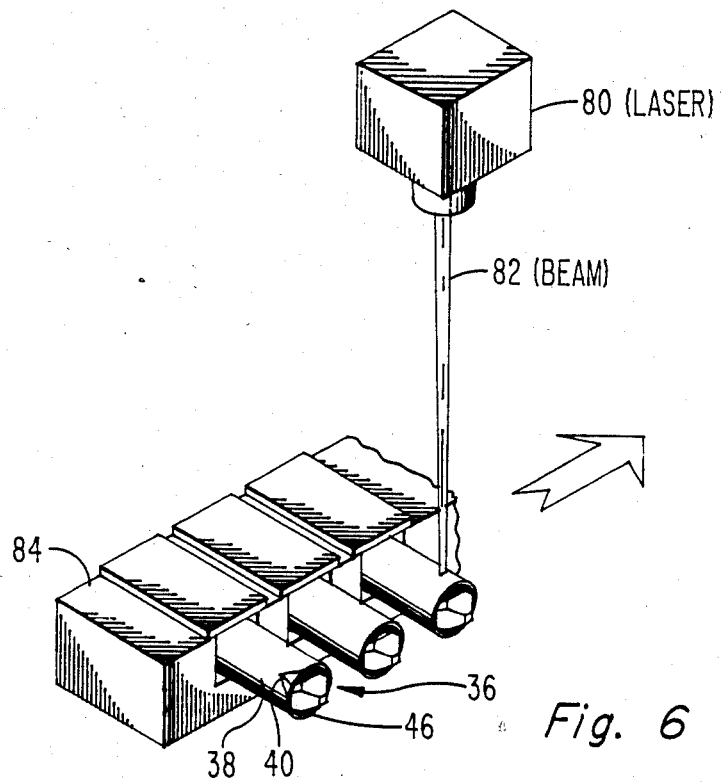
FIG. 6 is a schematic showing the heating step for brazing the stone to the shank by a scanned laser beam.

The shank 38 is next exposed to a high temperature heating step using a laser as will be explained. The shank 38 with the dry brazing powder surrounding the stone 36 is then positioned in a fixture 84 which orients the stylus in a horizontal position as shown in FIG. 6. The fixture 84 is arranged to translate the stylus 38 in a rapid horizontal movement through a laser beam 82. A laser 80 provides the beam 82 to the surface of the shank 38 at a location about 0.010 inch below the shank end 39. In this way the heat of the laser beam 82 is conducted to the braze mixture 46 to effect the brazing of the stone 36 to the surface of the indentation 40 without damaging the stone as would occur if direct heat from the laser beam 82 were to be applied directly on the stone. During the laser heating process, the brazing mixture 46 bonds or brazes the stone 36 to the shank 38 thereby providing a uniform braze. A suitable laser is a $CO_2$ type with 0.015 inch focused beam diameter and 21 watts of delivered power.

The beam 82 is preferably a continuous beam that is either focused at one fixed location on the surface of the shank 38 or effects a scan across the surface of the shank as by moving the shank 38 relative to the beam 82.

The brazing material melts in the range of 780° to 795° C. A temperature of about 1050° C. is needed to braze the diamond to the shank. The laser beam 82 heats the shank 38 adequately at a location just below the diamond 36 to achieve the brazing temperature.

It may be desirable to provide a suitable inert cover gas, such as argon, to minimize or exclude oxygen from the brazed area between the stone 36 and the shank indentation 40. This is done by having a hose (not shown) carrying argon flooding the area, or by encasing the apparatus in argon.

Suitable apparatus will be apparent to those skilled in the art for holding the shank in the position shown in FIGS. 3, 4 and 6 and effecting vertical movement of the surface 70 to move a particular stone into the vicinity of the wetted shank end 38. Such apparatus forms no part of the present invention.

In the preferred form of the invention, a suitable fixture 84 is arranged to carry a plurality of shanks above the surface 70. The typical fixture 84 carries 50 such shanks and is arranged to move them in series along a path traversing the laser beam 82.

While the preferred embodiment uses diamond coated with a film of titanium or zirconium, a powdered form of the hydride of those metals can be added to the braze material for uncoated diamonds. A 3 to 10 weight percent of titanium hydride ($TiH_2$) or zirconium hydride ($ZrH_2$) added to the brazing material would serve this purpose.

I have discovered that the fabrication of a stylus blank carrying the stone 36 brazed to a shank 38 according to this invention has been very successful with yields of at least 94%. An acceptable stylus comprises a stone that is properly seated and resists push-off forces of about 200 grams, which force greatly exceeds the actual operating condition to which the completed stylus can be subjected.

What is claimed is:

1. A method for bonding a diamond stone to a metallic shank, said diamond stone having a plurality of facets wherein the improvement comprises the steps of:
    (a) providing on a surface at least one diamond stone having a predetermined crystallographic form;
    (b) providing an indentation at one end of said shank substantially conforming to a portion of said stone;
    (c) wetting the indentation of said shank with an agent for wetting said indentation and capable of wetting said stone;
    (d) orienting said shank along its longitudinal axis with its indented end positioned downwardly over said surface; and
    (e) moving said surface relative to said shank end to contact said stone with said wetting agent so as to wet said stone and to draw said stone upwardly into said indentation.

2. The method of claim 1 wherein said stone is a cubo-octahedron having one facet that is larger than the other facets of said stone, and further comprising the step of positioning said stone in said indentation so that said large facet is facing away from said shank along a plane orthogonal to the axis of the shank.

3. The method of claim 1 wherein said wetting agent has the properties of surface tension to wet the respective surfaces of the stone and the shank to hold the stone in position in the indentation in said shank, a slow evaporation rate, of low residue on evaporation and capable of wetting a brazing powder.

4. The method of claim 1 wherein said wetting agent is diethylene glycol monobutyl ether acetate.

5. The method of claim 1 wherein said wetting agent is 2-octanol.

6. The method of claim 1 wherein said wetting agent is diethylene glycol dibutyl ether.

7. The method of claim 1 further including the step of adding a brazing material between said stone and said shank end by touching said material to said wetting agent.

8. The method of claim 7 further including the step of making a paste of said brazing material with said wetting agent.

9. The method of claim 7 further including the step of evaporating said wetting agent.

10. The method of claim 9 further including the step of heating said shank directly by a laser beam so as to heat said shank sufficiently to braze said stone to said shank by heat conducted by said shank to said stone.

11. The method of claim 10 wherein said laser heating step includes the step of moving said shank through a fixed-position laser beam.

12. The method of claim 11 further including the step of providing an inert cover gas over said stone and shank to inhibit oxygen from entering into the braze.

13. The method of claim 7 further including the step of forming the brazing alloy from a homogeneous mixture of about 71% silver (Ag), 28% copper (Cu), 0.75% nickel (Ni) and about 0.28% in the aggregate of at least one of the metals taken from the group consisting of ruthenium (Ru), rhodium (Rh), and iridium (Ir), all in weight percent.

14. The method of claim 7 further including the step of forming the brazing mixture from a mixture in weight percent of about 71% silver (Ag), 28% copper (Cu), 0.75% nickel (Ni), and 0.25 to 0.35% ruthenium (Ru).

15. The method of claim 7 further including the step of forming the brazing material from a mixture in weight percent of about 71% silver (Ag), 28% copper (Cu), 0.75% nickel (Ni), and 0.25 to 0.35% rhodium (Rh).

16. The method of claim 7 further including the step of forming the brazing material from a mixture in weight percent of about 71% silver (Ag), 28% copper (Cu), 0.75% nickel (Ni), and 0.25 to 0.35% iridium (Ir).

17. The method of claim 7 further including the step of mixing said material in said wetting agent to form a paste before adding the material between said stone and shank end.

18. The method of claim 1 further comprising the step of providing a film of titanium metal on said stone.

19. The method of claim 7 further comprising the step of adding a material selected from the group consisting of titanium hydride ($TiH_2$) and zirconium hydride ($ZrH_2$) to said brazing material.

20. A method for bonding a diamond stone to a metallic shank wherein the improvement comprises the steps of:
(a) providing on a surface at least one diamond stone;
(b) providing an indentation at one end of said shank conforming to a portion of said stone;
(c) wetting the indentation of said shank with an agent for wetting said indentation and capable of wetting said stone;
(d) orienting said shank along its longitudinal axis with its indented end positioned downwardly over said surface; and
(e) moving said surface relative to said shank end so as to wet sufficiently said stone to draw said stone into said indentation.

* * * * *